United States Patent
Nathan et al.

(10) Patent No.: US 7,681,949 B2
(45) Date of Patent: Mar. 23, 2010

(54) HAPTIC VEHICLE SEAT

(75) Inventors: John F. Nathan, Highland Township, MI (US); H. Winston Maue, Northville, MI (US); David A. Powell, Bloomfield Hills, MI (US); Oliver J. Young, Grosse Pointe, MI (US)

(73) Assignee: Lear Corporation, Southfield, MI (US)

( * ) Notice: Subject to any disclaimer, the term of this patent is extended or adjusted under 35 U.S.C. 154(b) by 373 days.

(21) Appl. No.: 11/279,487

(22) Filed: Apr. 12, 2006

(65) Prior Publication Data
US 2007/0241595 A1    Oct. 18, 2007

(51) Int. Cl.
A47C 7/72 (2006.01)

(52) U.S. Cl. .................. 297/217.3; 601/57; 601/58; 601/59

(58) Field of Classification Search ............... 297/217.3, 297/260.2, 330; 601/51–54, 56–65; 5/915
See application file for complete search history.

(56) References Cited

U.S. PATENT DOCUMENTS

| | | | |
|---|---|---|---|
| 3,019,784 A * | 2/1962 | Eiden ........................... 601/58 |
| 3,455,296 A | 7/1969 | McCales |
| 3,831,591 A * | 8/1974 | Newkirk ....................... 601/58 |
| 3,878,838 A | 4/1975 | Lunn |
| 3,885,553 A * | 5/1975 | Vecchio ........................ 601/15 |
| 5,437,608 A | 8/1995 | Cutler |
| 5,523,664 A | 6/1996 | Ogasawara |
| 5,917,415 A | 6/1999 | Atlas |
| 6,053,880 A * | 4/2000 | Sleichter, III ......... 297/217.3 X |
| 6,056,357 A * | 5/2000 | Fukuoka .................. 297/217.3 |
| 6,077,238 A | 6/2000 | Chung |
| 6,087,942 A | 7/2000 | Sleichter, III et al. |
| 6,106,576 A | 8/2000 | Fromson |
| 6,663,178 B2 * | 12/2003 | Fourrey et al. ............ 601/59 X |
| 6,669,219 B2 | 12/2003 | Turner et al. |
| 6,669,291 B1 | 12/2003 | Hsiao |
| 6,744,370 B1 | 6/2004 | Sleichter, III et al. |
| 2004/0049323 A1 * | 3/2004 | Tijerina et al. .................. 701/1 |
| 2005/0042300 A1 | 2/2005 | Boldogh et al. |
| 2005/0258977 A1 | 11/2005 | Kiefer et al. |
| 2006/0131093 A1 * | 6/2006 | Egami ........................ 180/272 |
| 2007/0032752 A1 * | 2/2007 | Wu ............................. 601/57 |
| 2007/0210903 A1 * | 9/2007 | Lefranc ...................... 340/438 |

FOREIGN PATENT DOCUMENTS

DE    4116836 A1    11/1992

(Continued)

OTHER PUBLICATIONS

Search and Examination Report for corresponding Great Britain application No. GB0706542.8, received Aug. 6, 2007, 7 pages.

(Continued)

*Primary Examiner*—Anthony D Barfield
(74) *Attorney, Agent, or Firm*—Brooks Kushman P.C.

(57) ABSTRACT

A haptic seat and system for use in imparting sensations to an occupant thereof. The haptic seat may be used to alert passengers of various operating conditions with some sort of tactile sensation, such as a vibration, pulse, shake, or other inducement that involves the occupant's sense of touch.

21 Claims, 4 Drawing Sheets

FOREIGN PATENT DOCUMENTS

| | | | |
|---|---|---|---|
| DE | 29617091 | U1 | 3/1997 |
| DE | 20205116 | U1 | 11/2002 |
| EP | 1475066 | A3 | 11/2004 |
| EP | 1526031 | A2 | 4/2005 |
| EP | 1688118 | A1 | 8/2006 |
| EP | 1688119 | A1 | 8/2006 |
| FR | 2889495 | A1 | 2/2007 |
| JP | 2001199296 | A1 | 7/2001 |
| WO | 03011638 | A1 | 2/2003 |
| WO | 2005087544 | A1 | 9/2005 |
| WO | 2005116956 | A2 | 12/2005 |

OTHER PUBLICATIONS

German Office Action for corresponding Application No. 10 2007 016 998.3, mailed Jan. 21, 2009, 3 pages.
Corrected Search Report for corresponding Application No. GB0706542.8, mailed Feb. 25, 2008, 3 pages.
Great Britain Search Report for corresponding application No. GB0706542.8, mailed Jul. 8, 2008, 4 pages.

* cited by examiner

HAPTIC VEHICLE SEAT

BACKGROUND OF THE INVENTION

1. Field of the Invention

The present invention relates to haptic seats of the type used in vehicles, such as automobiles

2. Background Art

A haptic vehicle seat is configured to impart sensations to an occupant thereof. The sensation may include vibrations, pulses, shakes, or some other inducement that involves the occupants sense of touch.

SUMMARY OF THE INVENTION

One non-limiting aspect of the present invention relates to haptic vehicle seat. The seat may include a seat cushion for supporting an occupant, an impulse distribution arm in communication with the seat cushion, an actuator attached to the arm and configured to vibrate the arm such that at least a portion of a vibration induced in the arm travels through the seat cushion to be felt by the occupant.

The seat cushion may include a support material and the impulse distribution arm may rest on a top side of the support material. Optionally, the impulse distribution arm may rests within a trench on the top side of the support material.

The seat cushion may include a support material and the impulse distribution arm is may be embedded within the support material.

The seat cushion may include a trim lining attached to a trim bracket such that the trim bracket forms at least a portion of the impulse distribution arm.

The actuator may include a motor, rotor, and eccentric weight such that the motor configured to rotate the eccentric weight in order to vibrate the arm. Optionally, the actuator includes a housing surrounding the motor, weight, and rotatable shaft, with an outer portion thereof including a fastener for attaching the actuator to the arm such that the arm is vibrated without directly connecting to the motor, weight, or shaft.

The seat may further include at least one additional impulse distribution arm and actuator, with each actuator being attached to different impulse distribution arms.

The seat cushion may include a connecting feature for connecting to a seat track mounted on a vehicle floor.

The seat cushion may be part of seat bottom or seat back, each of the seat bottom and seat back having a generally rectangular shape, wherein the arm mimics the generally rectangular shape of the seat bottom or seat back.

One non-limiting aspect of the present invention relates to a haptic seating system for use with a vehicle. The system may include a controller configured to issue a warning signal as a function of vehicle operating parameters, a vehicle seat having a seat for supporting an occupant, an impulse distribution arm in communication with the seat, and an actuator in communication with the controller. The actuator may be attached to the arm and configured to vibrate the arm in response to receipt of the warning signal such that at least a portion of a vibration induced in the arm travels through the seat to be felt by the occupant.

One non-limiting aspect of the present invention relates to an actuator configured to induce a vibration within an impulse distribution arm. The actuator may include a motor configured to rotate a shaft, an eccentric weight connect to the shaft such that rotation of the shaft cause the eccentric weight to vibrate the motor, and a housing attached to and surrounding the motor. Optionally, an outer portion of the housing including a fastener for attaching to the impulse distribution arm such that the impulse distribution arm is vibrated without directly connecting to the motor, weight, or shaft.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
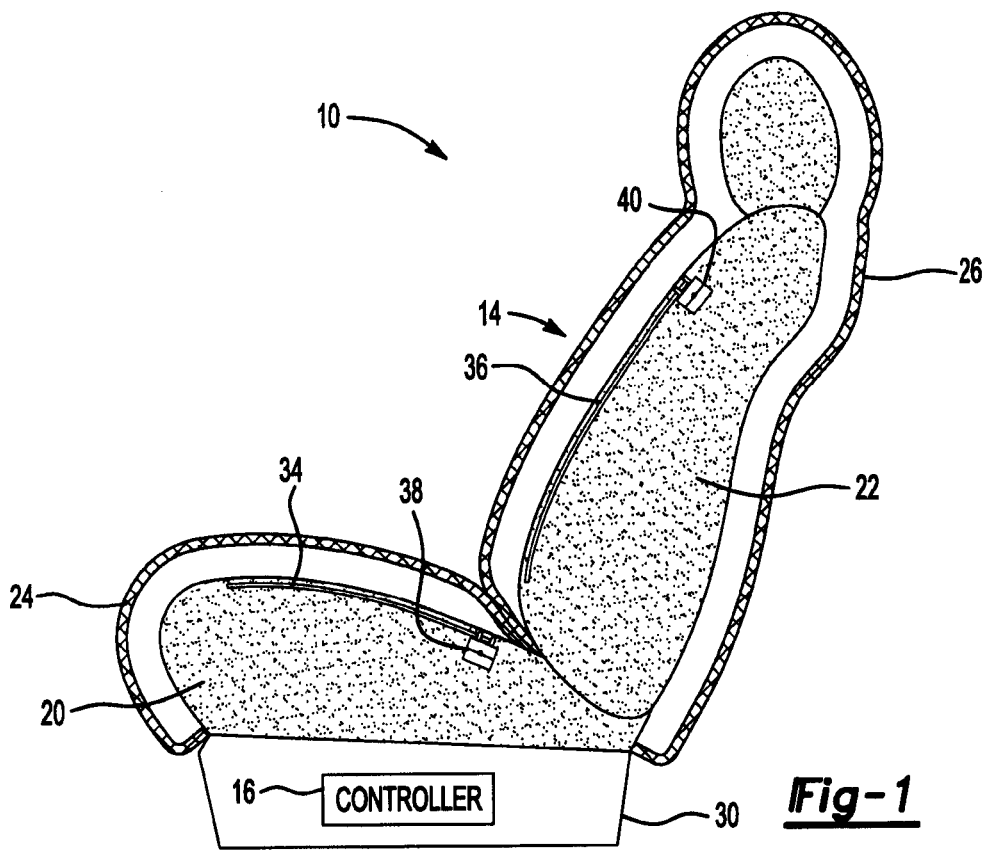
FIG. 1 illustrates a haptic seating system in accordance with one non-limiting aspect of the present invention.

FIG. 1 illustrates a haptic seating system 10 in accordance with one non-limiting aspect of the present invention. The system 10 may be used to provide passenger seating in vehicles and other environments where it is desirable to alert passengers of various operating conditions with some sort of tactile sensation, such as a vibration, pulse, shake, or other inducement that involves the occupant's sense of touch.

The system 10 generally includes a haptic seat 14 and controller 16, such as vehicle system controller. The controller 16 may be configured to monitor vehicle operating parameters and to generate a warning/seat control signal as a function thereof. The signal may be used to control vibrations within the seat 14, and thereby, alerting of the passenger. The controller 16 may vary the characteristics and/or instructions embedded within the signal in order to control the type, frequency, amplitude, and other characteristics of the seat vibration.

For example, if the vehicle is an automobile, the controller 16 may be configured to determine lane departures, impending rear/side/front impacts, and drowsy driver conditions as a function any number of vehicle operating parameters. In more detail, the automobile may include video and/or other features for detecting lane departures, video/radar and/or other features to detect impending rear/side/front impacts, video and/or other features to monitor driver drowsiness (i.e., a driver response to visual indicators, posture, head positioning, etc. may be used to indicate drowsiness).

Of course, the controller 16 may monitor and process any number variables for use in controlling seat vibrations and the present invention is not intended to be limited to the foregoing. In particular, the present invention fully contemplates the use of any number of parameters for determining conditions under which it may be advantageous to alert the passenger. Moreover, the present invention fully contemplates varying or otherwise adjusting the vibrations as a function of the severity of the alert and any number of other parameters.

The seat 14 may include a bottom seat cushion 20 and back seat cushion 22 such that a bottom trim lining 24 and back trim lining 26 may be arranged over top of the seat cushions 20-22 to protect the seat cushions 20-22 and to provided variable surface amenities and textures. The seat cushions 20-22 and linings 24-26 may comprise any suitable material. For example, the seat cushions 20-22 may comprise a foam material and the seat linings 24-26 may comprise a cloth or leather material.

The seat 14 may include a connecting feature 30 for connecting to a seat track (not shown) of a vehicle floor (not show). The connecting feature 30 may include any number of elements, devices, fasteners, actuators, and other members commonly employed with vehicle seating to facilitate attachment of the seat track to the seat track such that the position of the seat may be adjusted by adjusting its positioning with respect to the seat track, as one having ordinary skill in the art will appreciate.

The seat 14 may include one or more impulse distribution arms 34-36 and actuators 38-40 resting on top of the bottom seat cushion 20 and the back seat cushion 22. The actuators 38-40 are attached to the impulse distribution arms 34-36 and configured to vibrate the arms 34-36 such that at least a portion of a vibration induced in the arms 34-36 travels through the seat 14 to be felt by the occupant. This vibration may be used to provided the haptic alert function described above.

The impulse distribution arms 34-36 and actuators 38-40 shown in FIG. 1 rests on a top side of the seat cushions 20-22. The impulse distribution arms 34-36 may comprises any suitably rigid or semi-rigid material having characteristics conducive to transmitting the vibrations from the actuators 38-40 through the seat 14 so that the vibrations may be felt by the seat occupants. For example, the impulse distribution arms 34-36 may comprise any suitably rigid or semi-rigid material or wire that may be shaped and contoured according to the shape and contour of the seat cushions 20-22 and lining 24-26.

Figure 2:
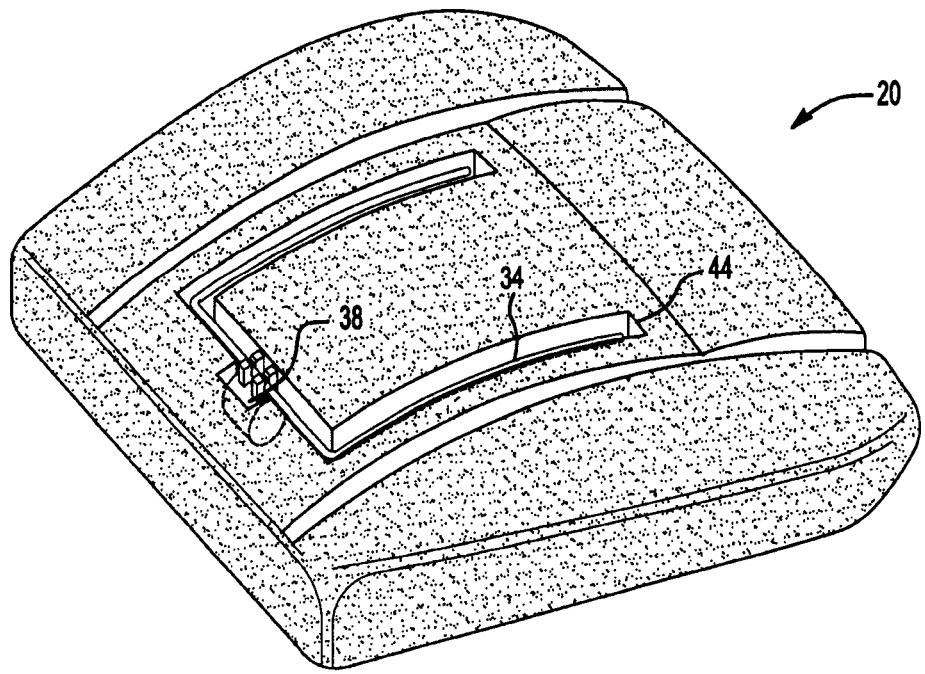
FIG. 2 illustrates a seat bottom including a trench on a top side thereof for receiving an impulse distribution arm and actuator in accordance with one non-limiting aspect of the present invention.

FIG. 2 illustrates the bottom seat cushion 20 including a trench 44 on a top side thereof for receiving the impulse distribution arm 34 and actuator 38 in accordance with one non-limiting aspect of the present invention. As shown, the trench 44 provides a slight relief below the top side of the seat cushion 20 such that the impulse distribution arm 34 and actuator 38 rest below the top surface of the bottom seat cushion 20. The back seat cushion 22 and corresponding impulse distribution arm 36 and actuator 40 may be arranged in a similar manner.

As shown, the impulse distribution arm 34 extends around a portion of a perimeter of the bottom seat cushion 20 such that it mimics the shape of the bottom seat cushion 20. This can be advantageous in evenly spreading out the vibrations induced to the seat cushion 20 so that the passenger feels a uniform vibration over a larger portion of the seat cushion 20. Of course, the present invention is not intended to be limited to any particular arrangement of the impulse distribution arm 34 and fully contemplates any number of other shapes and contours for the same.

Figure 3:
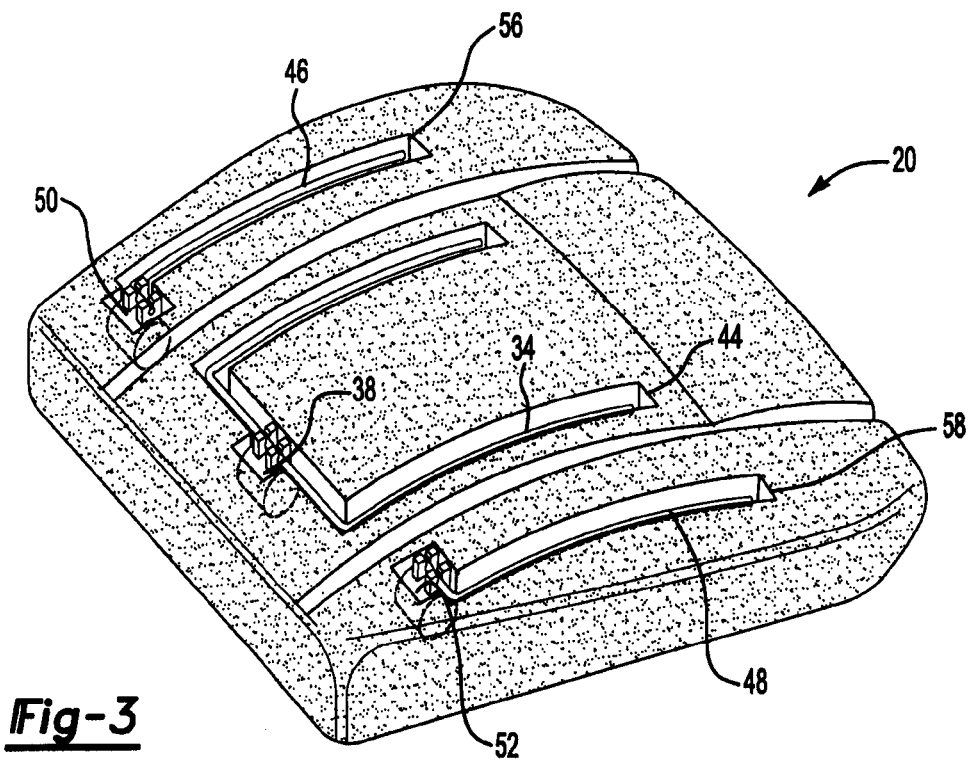
FIG. 3 illustrates the bottom seat cushion including additional impulse distribution arms and actuators in accordance with one non-limiting aspect of the present invention.

FIG. 3 illustrates the bottom seat cushion 20 including additional impulse distribution arms 46-48 and actuators 50-52 in accordance with one non-limiting aspect of the present invention. Each additional impulse distribution arm 46-48 and corresponding actuator 50-52 may be standalone entities such that the vibrations induced by each may separately controlled and operated, such as to provide different warnings and other indicators to the seat passenger.

Similar to the impulse distribution arm 34 and actuator 38 shown in FIG. 2, the additional impulse distribution arms 46-48 and actuators 50-52 of FIG. 3 may rest within trenches 56-58 on a top side of the bottom seat cushion 20, just below the top surface. Optionally, as shown in FIGS. 4-5 the impulse distribution arms 34-36 and actuators 38-40 shown in FIGS. 1-2 may be included at different locations within the haptic seating system 10.

Figure 4:
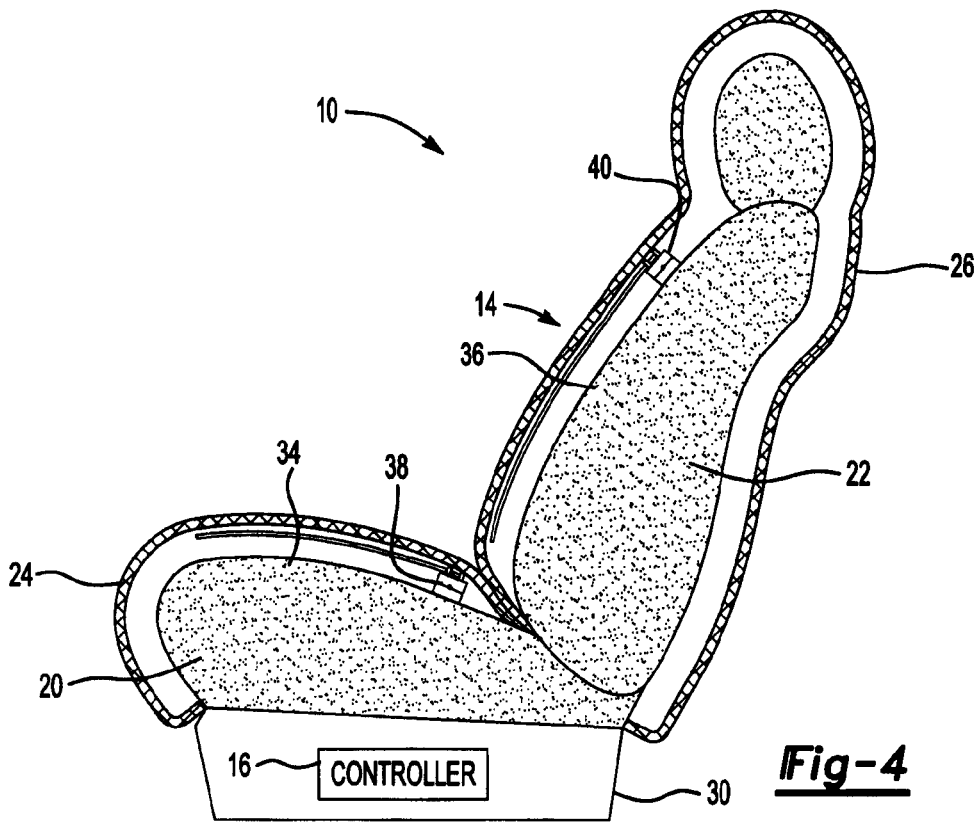
FIGS. 4-5 illustrate the impulse distribution arms and actuators at different locations within the haptic seating system in accordance with one non-limiting aspect of the present invention.
Figure 5:
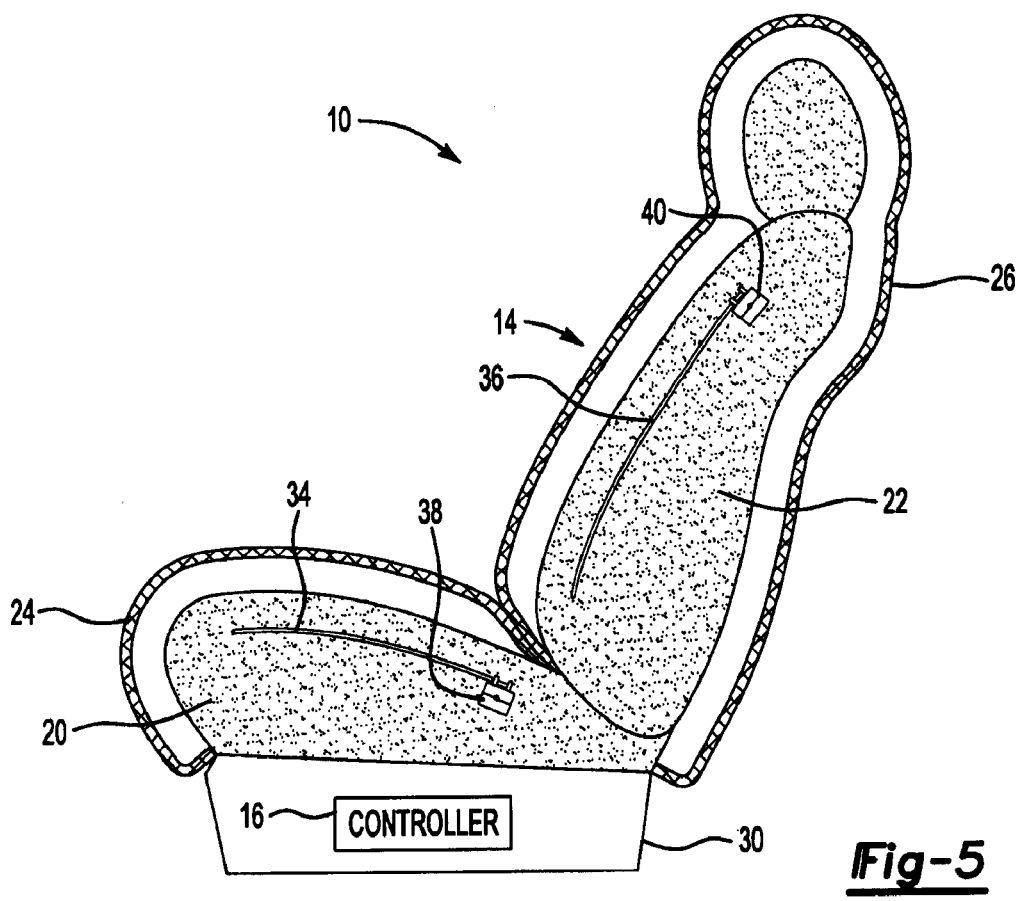

FIG. 4 illustrates the haptic seat system 10 including the impulse distribution arms 34-36 and actuators 38-40 attached to the trim linings 24-26 in accordance with one non-limiting aspect of the present invention. FIG. 5 illustrates the haptic seat system 10 including the impulse distribution arms 34-36 and actuators 38-40 embedded with the seat cushions 20-22 in accordance with one non-limiting aspect of the present invention.

The embedded impulse distribution arms 34-36 are covered by the foam or other material comprising the seat cushions 20-22. Optionally, the impulse distribution arms 34-36 may be included within a mold used to foam the seat cushions 20-22 such that the foam or other seat cushion material is molded around the impulse distribution arms 34-36. An opening or other relief may be similarly including within the mold to permit insertion of the actuators 38-40 after injection molding the seat cushions 34-36.

Figure 6:
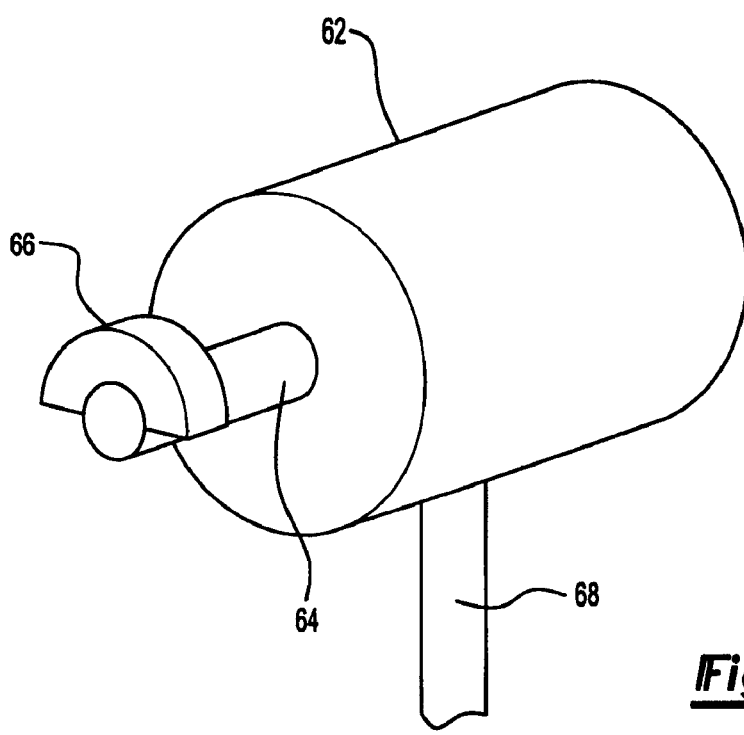
FIGS. 6-7 illustrate the actuator in accordance with one non-limiting aspect of the present invention.
Figure 7:
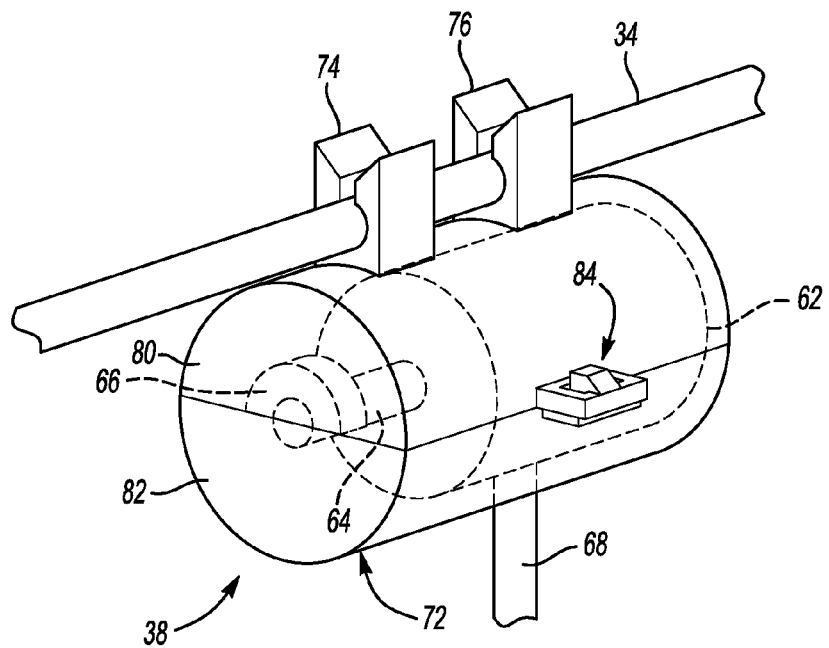

FIGS. 6-7 illustrate one of the actuators 3840 in accordance with one non-limiting aspect of the present invention. FIG. 6 illustrates the actuator 38 including a motor 62, rotatable shaft 64, eccentric weight 66, and communication line 68. The motor 62 may be any suitable electric motor having the capabilities to rotate the shaft 64 according to signals received from the controller 16 over the communication line 68.

As one having ordinary skill in the art will appreciate, rotation of the shaft 64 cause the eccentric weight 66 to impart variable forces on the motor 62. These forces cause the motor 62 to emit vibrations and other impulse, which are then transferred to the impulse distribution arms 34-36 for generating the haptic sensations described above. Optionally, the controller 16 may control the operation of the motor 62 in order to control the sensations imparted by the actuator.

FIG. 7 illustrates a housing 72 of the actuator 38 and its connection to the impulse distribution arm 34. As shown, the motor 62 is hidden within the housing 72 and connected to the impulse distribution arm 343 by way of fasteners 74-76. The hidden motor 62 is attached to an interior portion of the housing 72 such that the vibration of the motor 62 is imparted to the housing 72, and thereby, the impulse distribution arm 34. The housing 72 may include top and bottom portions 80-82 connected together by way of clip 84 such that the motor 62, weight 66, and shaft 64 may be easily inserted and covered within the housing.

The enclosure of the motor 62 and other accessories associated with generating the vibration is advantageous in preventing damage and wear to other seat system components that may come in contact with these moving elements if left uncovered. Likewise, this enclosure protects the motor 62 from exposed debris and other particulate contaminations that may influence its ability to operate over a prolonged period of time.

The attachment of the impulse distribution arm 34 to the housing 72 allows the present invention to distribute the vibrations of the housing 72 over a greater distance. For example, without the impulse distribution arm 34, the vibrations induced by the actuator 38 are localized to a relatively small and specific area of the seat 14 such that multiple actuators would be required to vibration as large an area as that which is vibrated with the impulse distribution arm 34 of the present invention.

The fasteners 74-76 used to attach the impulse distribution arm 34 to the housing 72 are press-fit type fasteners such that the impulse distribution arm 34 may be simply press-fit into the fasteners 74-76 for securing. Of course, the impulse distribution arm 34 may be attached to the housing 72 with fasteners 74-76 of any number of other suitable configurations and components.

The impulse distribution arms 34-36 described in FIGS. 1 and 5 are additional features added to the seating system 10 to distribute the vibrations and other impulses throughout the cushions 20-22. (The trim lining distribution of FIGS. 4 and 7 are also distribution vibrations though the seat cushions 20-22, but the vibrations are imparted to the trim linings 24-26, rather than directly to the seat cushions 20-22.)

The present invention also contemplates the use of existing wires, frames, and other support features included within the seating system 10 so as to eliminate the need to include the impulse distribution arms 34-36 as add-on features. For example, as one having ordinary skill in the art will appreciate, the seat cushions 20-22 may be supported on springs or other relatively rigid wires such that the actuator 38 may be similarly attached to these wires and the wires themselves used as the distribution arms.

Figure 8:
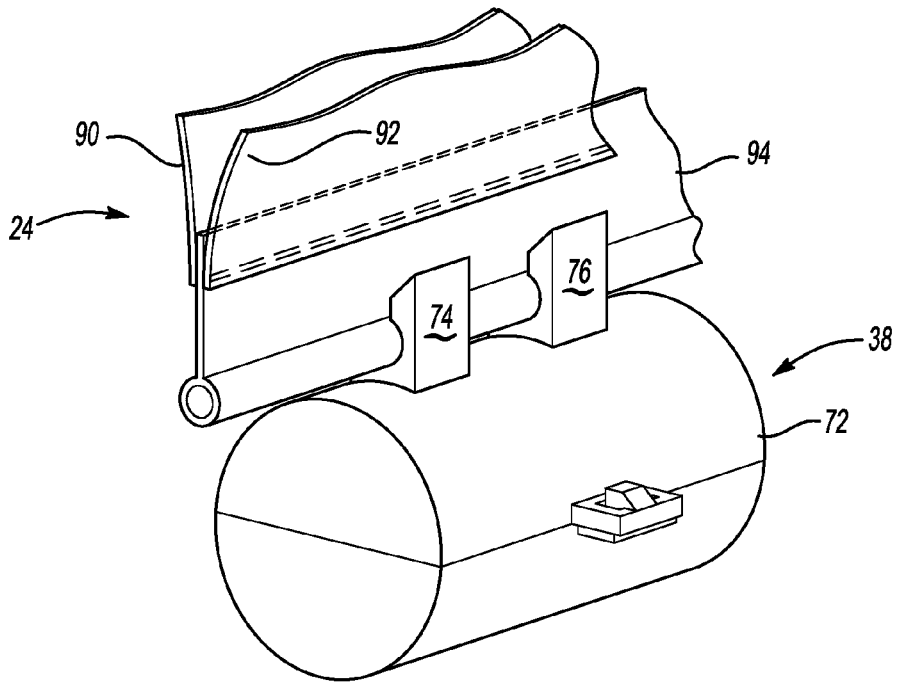
FIG. 8 illustrates the actuator imparting vibration to a trim lining in accordance with one non-limiting aspect of the present invention.

FIG. 8 illustrates the actuator imparting vibration to the trim linings 24-26 in accordance with one non-limiting aspect of the present invention. Each trim lining 24-26 may include cloth or leather portion 90, 92 that are sown to a plastic trim bracket 94, as one having ordinary skill in the art will appreciate. The actuator 38 may attached to the plastic trim bracket 94 order to impart vibrations thereto. In this manner, the actuator 38 is integrated with the trim lining 24 such that a portion of the seams of the trim lining 24 are vibrated with the actuator and imparted to the seat cushions 20-22 and occupant.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A haptic vehicle seat comprising:
a seat cushion for supporting an occupant, the seat cushion having top, bottom and sides that together define a support area having a support material;
an impulse distribution arm in communication with the seat cushion;
an actuator removably clipped to the arm with a press-fit connection, the actuator being configured to induce a vibration into the arm that travels throughout the seat cushion, the actuator being embedded within the support material between the sides and below the top of the support area; and
wherein the seat cushion includes a pair of cloth or leather trim linings sown together at a plastic trim bracket and wherein the trim bracket forms at least a portion of the impulse distribution arm.

2. The seat of claim 1 wherein the impulse distribution arm rests on a top side of the support material.

3. The seat of claim 2 wherein the impulse distribution arm rests within a trench on the top side of the support material.

4. The seat of claim 1 wherein the impulse distribution arm and actuator are covered by the support material.

5. The seat of claim 1 wherein the actuator includes a motor that rotates an eccentric weight in order to vibrate the arm.

6. The seat of claim 5 wherein the actuator includes a housing surrounding the motor and weight, an outer portion of the housing including an integrally molded fastener that establishes the press-fit connection of the actuator to the arm.

7. The seat of claim 1 further comprising at least one additional impulse distribution arm and actuator, each actuator being attached to different impulse distribution arms.

8. The seat of claim 1 wherein the seat cushion includes a connecting feature for connecting to a seat track mounted on a vehicle floor.

9. The seat of claim 1 wherein the seat cushion is part of seat bottom or seat back, each of the seat bottom and seat back having a generally rectangular shape, wherein the arm in a non-structural element that mimics the generally rectangular shape of the seat bottom or seat back.

10. A haptic seating system for use with a vehicle, the system comprising:
a controller configured to issue a warning signal as a function of vehicle operating parameters;
a vehicle seat having a trim lining surrounding at least a top and side circumferential portion of a seat cushion made of a support material, the trim lining being of a different material than the support material;
wherein at least two portions of the trim lining are sown together at a location below an outside, exposed surface of the trim lining that is hidden from view; and
an actuator in communication with the controller, the actuator being removably clipped to the at least two sown and hidden portions of the trim lining and configured to vibrate the trim lining in response to receipt of the warning signal.

11. The system of claim 10 further comprising an impulse distribution arm connected to the actuator that rests on a top side of the support material and that vibrates with the trim lining.

12. The system of claim 11 wherein the impulse distribution arm rests within a trench on the top side of the support material.

13. The system of claim 10 further comprising an impulse distribution arm connected to the actuator that is embedded within the support material.

14. The system of claim 10 wherein the actuator includes a motor, rotatable shaft, and eccentric weight, the motor configured to rotate the eccentric weight in order to vibrate the arm.

15. The system of claim 14 wherein the actuator is embedded within that support material such that all sides of the actuator, except for a portion connected to the trim lining, are covered by the support material.

16. The system of claim 10 wherein at least a portion of each of the at least two sown and hidden portions extend vertically downward from a top horizontal portion of the trim lining.

17. The system of claim 16 wherein the actuator removably attaches only to the portions that extend vertically downward.

18. The system of claim 17 wherein the actuator is removably clipped to the portions that extend vertically downward with a compression force.

19. A haptic vehicle seat comprising:
- a seat cushion for supporting an occupant, the seat cushion having a cushioning material surrounded by a cloth or leather material;
- an impulse distribution arm extending around substantially all of an outer perimeter of the seat cushion;
- an actuator configured to induce a vibration into the arm such that the vibration travels around substantially all of the of the outer perimeter of the seat cushion, wherein the actuator is positioned below a top of the cushioning material at a depth that causes any vibrations induced by the actuator to the cushioning material to be substantially insignificant relative to the vibration inducted to the impulse distribution arm; and
- wherein the arm has a goal-post shape, the goal-post shape four straight leg portions where a center one of the legs forms a center portion from which two of the legs extend in a direction opposite to a last one of the legs, and wherein the last one of the legs is the only leg directly connected to the actuator.

20. The haptic vehicle seat of claim 19 wherein the depth is such that the actuator is vibrationally isolated from the seat occupant in that any vibrations induced by the actuator to the cushioning material are not noticeably communicated to the top side of the cushioning material and the surrounded cloth or leather material.

21. The haptic vehicle seat of claim 19 wherein the actuator includes a motor configured to rotate a shaft connected to an eccentric weight and the arm is cylindrically shaped throughout, the cylindrically shaped arm having a diameter approximately equal to a diameter of the shaft.

* * * * *